United States Patent
Nakajima et al.

(10) Patent No.: US 11,940,190 B2
(45) Date of Patent: Mar. 26, 2024

(54) REFRIGERATION CYCLE APPARATUS

(71) Applicant: Mitsubishi Electric Corporation, Tokyo (JP)

(72) Inventors: Komei Nakajima, Tokyo (JP); Yusuke Tashiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 17/611,228

(22) PCT Filed: Jul. 16, 2019

(86) PCT No.: PCT/JP2019/027940
§ 371 (c)(1),
(2) Date: Nov. 15, 2021

(87) PCT Pub. No.: WO2021/009850
PCT Pub. Date: Jan. 21, 2021

(65) Prior Publication Data
US 2022/0214088 A1     Jul. 7, 2022

(51) Int. Cl.
*F25B 41/20* (2021.01)
*F16K 11/06* (2006.01)
(Continued)

(52) U.S. Cl.
CPC .............. *F25B 41/20* (2021.01); *F25B 13/00* (2013.01); *F16K 11/065* (2013.01);
(Continued)

(58) Field of Classification Search
CPC ....................................................... F16L 55/46
See application file for complete search history.

(56) References Cited

U.S. PATENT DOCUMENTS

2015/0184872 A1* 7/2015 Oh ........................... F24F 1/32
165/122
2015/0204599 A1* 7/2015 Chisaki ..................... F24F 1/24
62/426

FOREIGN PATENT DOCUMENTS

CN    204678746 U    9/2015
JP    S52-143050 U   10/1977
(Continued)

OTHER PUBLICATIONS

Office Action dated Sep. 20, 2022 issued in corresponding JP Patent Application No. 2021-532602 (with English translation).
(Continued)

*Primary Examiner* — Kevin R Barss
(74) *Attorney, Agent, or Firm* — POSZ LAW GROUP, PLC

(57) ABSTRACT

A refrigeration cycle apparatus includes a compressor, a four-way valve, a first outdoor heat exchanger, a first expansion valve, and an indoor heat exchanger. The four-way valve includes a casing, a first flow channel, a second flow channel, a flow channel switching piston, and a wall portion. The flow channel switching piston is configured to slide along an inner surface to switch between passing the refrigerant through the first flow channel and passing the refrigerant through the second flow channel. The wall portion is configured to slide along the inner surface together with the flow channel switching piston and is disposed with a space between the flow channel switching piston and wall portion to cover the flow channel switching piston.

10 Claims, 13 Drawing Sheets

(51) Int. Cl.
*F25B 13/00* (2006.01)
*F16K 11/065* (2006.01)

(52) U.S. Cl.
CPC .............. *F25B 2313/02741* (2013.01); *F25B 2600/2513* (2013.01); *F25B 2600/2519* (2013.01)

(56) References Cited

FOREIGN PATENT DOCUMENTS

| | | |
|---|---|---|
| JP | H01-314870 A | 12/1989 |
| JP | 2018-179058 A | 11/2018 |

OTHER PUBLICATIONS

Office Action dated Oct. 17, 2022 issued in corresponding AU Patent Application No. 2019457511.
International Search Report of the International Searching Authority dated Aug. 27, 2019, issued in corresponding International Application No. PCT/JP2019/027940.
Extended European Search Report dated Jun. 10, 2022 in connection with corresponding EP Patent Application No. 19937643.5.

* cited by examiner

REFRIGERATION CYCLE APPARATUS

CROSS REFERENCE TO RELATED APPLICATION

This application is a U.S. national stage application of PCT/JP2019/027940 filed on Jul. 16, 2019, the contents of which are incorporated herein by reference.

TECHNICAL FIELD

The present invention relates to a refrigeration cycle apparatus.

BACKGROUND ART

In a conventional refrigeration cycle apparatus, a four-way valve is configured to switch a flow channel by laterally sliding a flow channel switching piston that partitions a high-pressure side and a low-pressure side of a refrigerant circuit. For example, Japanese Patent Laying-Open No. 01-314870 (PTL 1) discloses a four-way valve configured to switch a flow channel by laterally sliding a flow channel switching piston that partitions a high-pressure side and a low-pressure side of a refrigerant circuit.

CITATION LIST

Patent Literature

PTL 1: Japanese Patent Laying-Open No. 01-314870

SUMMARY OF INVENTION

Technical Problem

In the four-way valve disclosed in the above publication, there is a gap between the flow channel switching piston and the installation surface along which the flow channel switching piston slides. This results in refrigerant leakage from the high-pressure side to the low-pressure side through this gap.

The present invention has been made in view of the above problem. An object of the present invention is to provide a refrigeration cycle apparatus that can reduce an amount of refrigerant leakage from a high-pressure side to a low-pressure side in a four-way valve.

Solution to Problem

A refrigeration cycle apparatus of the present invention includes a compressor, a four-way valve, a first outdoor heat exchanger, a first expansion valve, and an indoor heat exchanger. The compressor compresses the refrigerant. The four-way valve is connected to the compressor. The first outdoor heat exchanger is connected to the four-way valve. The first expansion valve is connected to the first outdoor heat exchanger. The indoor heat exchanger is connected to the first expansion valve and the four-way valve. The four-way valve is configured to switch between passing the refrigerant compressed by the compressor to the first outdoor heat exchanger and passing the refrigerant compressed by the compressor to the indoor heat exchanger. The four-way valve includes a casing, a first flow channel, a second flow channel, a flow channel switching piston, and a wall portion. The casing has an inner surface. The first flow channel and the second flow channel are disposed in the casing. The flow channel switching piston and the wall portion are disposed in the casing. The flow channel switching piston is configured to slide along the inner surface to switch between passing the refrigerant through the first flow channel and passing the refrigerant through the second flow channel. The wall portion is configured to slide along the inner surface together with the flow channel switching piston and is disposed with a space between the flow channel switching piston and the wall portion to cover the flow channel switching piston.

Advantageous Effects of Invention

According to the refrigeration cycle apparatus of the present invention, in the four-way valve, the wall portion is configured to slide along the inner surface together with the flow channel switching piston and is disposed with a space between the flow channel switching piston and the wall portion to cover the flow channel switching piston. The pressure of the refrigerant can thus be an intermediate pressure between a high-pressure side and a low-pressure side in the space between the wall portion and the flow channel switching piston. This can reduce an amount of refrigerant leakage from the high-pressure side to the low-pressure side in the four-way valve.

DESCRIPTION OF EMBODIMENTS

Embodiments of the present invention will be described below with reference to the drawings. Hereinbelow, identical or corresponding parts are identically denoted, and redundant description will not be repeated. The embodiments of the present invention will describe an air conditioner as an example refrigeration cycle apparatus. The refrigeration cycle apparatus is not limited to the air conditioner and may be, for example, a chiller.

Embodiment 1

Figure 1:
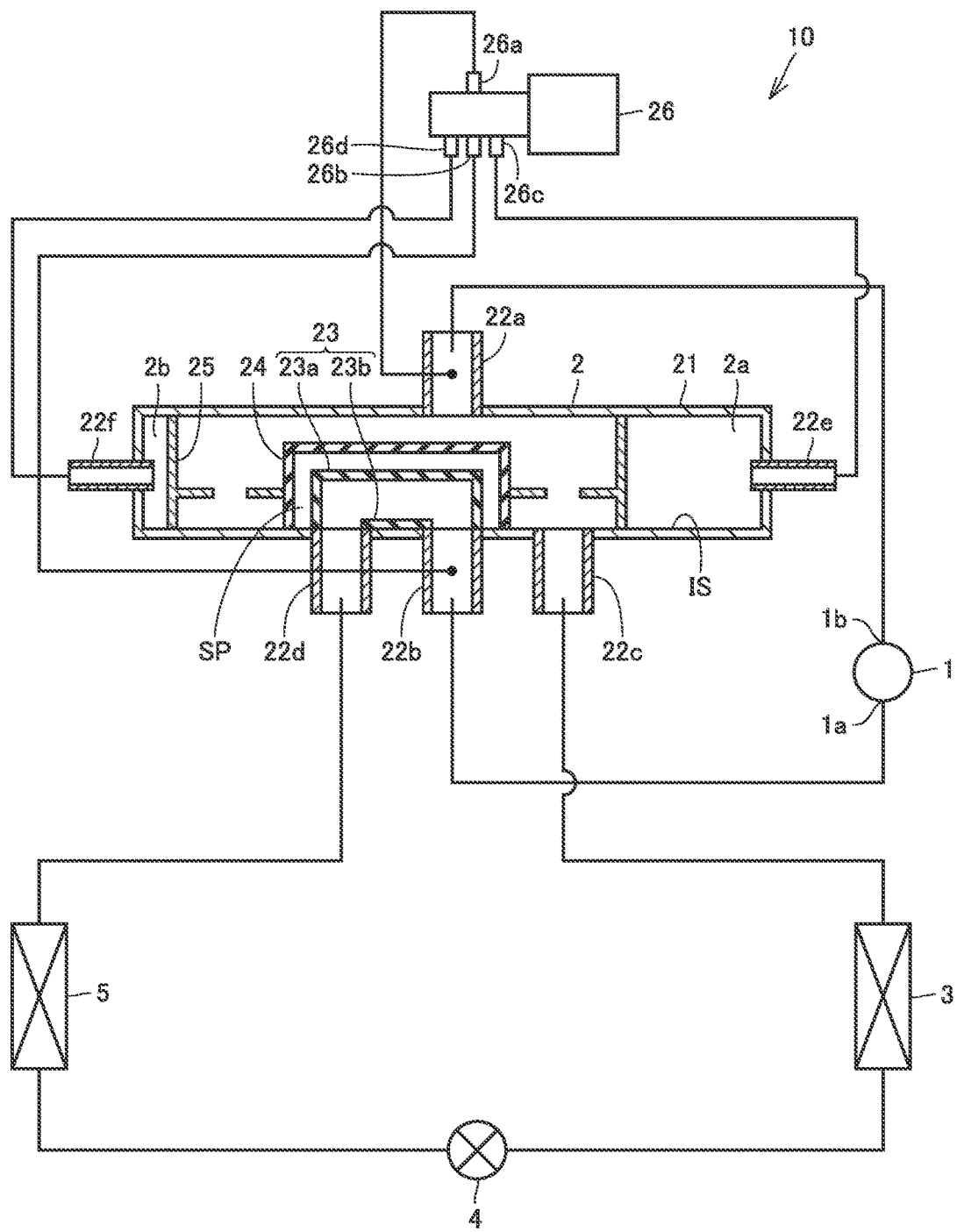
FIG. 1 is a refrigerant circuit diagram of a refrigeration cycle apparatus according to Embodiment 1.

A configuration of a refrigeration cycle apparatus 10 according to Embodiment 1 will be described with reference to FIG. 1. FIG. 1 is a refrigerant circuit diagram of refrigeration cycle apparatus 10 according to Embodiment 1. Refrigeration cycle apparatus 10 according to Embodiment 1 mainly includes a compressor 1, a four-way valve 2, a first outdoor heat exchanger 3, a first expansion valve, and an indoor heat exchanger 5. Compressor 1, four-way valve 2, first outdoor heat exchanger 3, the first expansion valve, and indoor heat exchanger 5 are connected by a pipe, thereby constituting a refrigerant circuit.

Compressor 1 is configured to compress refrigerant. Compressor 1 has an inlet 1a and an outlet 1b. Compressor 1 is configured to compress the refrigerant sucked from inlet 1a and discharge the refrigerant from outlet 1b. Compressor 1 may be configured to have a variable capacity. Compressor 1 may be configured to have a capacity that varies through adjustment of the rotation speed of compressor 1 based on an instruction from a controller (not shown).

Four-way valve 2 is connected to compressor 1, first outdoor heat exchanger 3, and indoor heat exchanger 5. Four-way valve 2 is configured to switch between passing the refrigerant compressed by compressor 1 to first outdoor heat exchanger 3 and passing the refrigerant compressed by compressor 1 to indoor heat exchanger 5. Specifically, four-way valve 2 is configured to switch a refrigerant flow so as to pass the refrigerant discharged from compressor 1 to first outdoor heat exchanger 3 during cooling operation and pass the refrigerant discharged from compressor 1 to indoor heat exchanger 5 during heating operation.

Four-way valve 2 includes a casing 21, a first flow channel F1, a second flow channel F2, a flow channel switching piston 23, a wall portion 24, a partitioning member (pressure receiving portion) 25, and a pilot valve 26.

Casing 21 has a cylindrical shape. Casing 21 has an interior space. Casing 21 has an inner surface IS. Inner surface IS forms a valve seat of four-way valve 2.

Casing 21 has a first connection port 22a, a second connection port 22b, a third connection port 22c, a fourth connection port 22d, a fifth connection port 22e, and a sixth connection port 22f. First connection port 22a is connected to outlet 1b of compressor 1. Second connection port 22b is connected to inlet 1a of compressor 1. Third connection port 22c is connected to first outdoor heat exchanger 3. Fourth connection port 22d is connected to indoor heat exchanger 5. First connection port 22a, second connection port 22b, third connection port 22c, and fourth connection port 22d are in communication with inner surface IS. Second connection port 22b is disposed to be opposite to first connection port 22a. Third connection port 22c and fourth connection port 22d are disposed to sandwich second connection port 22b therebetween. Second connection port 22b, third connection port 22c, and fourth connection port 22d are disposed on a straight line along the axis of casing 21. Fifth connection port 22e is in communication with the interior space of casing 21. Sixth connection port 22f is in communication with the interior space of casing 21.

First flow channel F1 and second flow channel F2 are disposed in casing 21. First flow channel F1 is configured to pass the refrigerant from first connection port 22a to third connection port 22c and pass the refrigerant from fourth connection port 22d to second connection port 22b. Second flow channel F2 is configured to pass the refrigerant from first connection port 22a to fourth connection port 22d and pass the refrigerant from third connection port 22c to second connection port 22b.

Flow channel switching piston 23 is disposed in casing 21. Flow channel switching piston 23 forms a valve body of four-way valve 2. Flow channel switching piston 23 includes a cover 23a and a bottom 23b. Cover 23a is configured to cover bottom 23b. A clearance between cover 23a and bottom 23b defines a flow channel. Flow channel switching piston 23 is configured to slide along inner surface IS. Flow channel switching piston 23 is configured to slide along inner surface IS to switch between passing the refrigerant through first flow channel F1 and passing the refrigerant through second flow channel F2. Flow channel switching piston 23 may be formed of a thermoplastic resin.

Wall portion 24 is disposed in casing 21. Wall portion 24 is connected to flow channel switching piston 23. Wall portion 24 is configured to slide along inner surface IS together with flow channel switching piston 23. Wall portion 24 is disposed with a space SP between flow channel switching piston 23 and wall portion 24 to cover flow channel switching piston 23. Space SP is provided as an intermediate layer between wall portion 24 and flow channel switching piston 23. Wall portion 24 entirely covers flow channel switching piston 23. In other words, wall portion 24 is disposed around flow channel switching piston 23 and is configured to surround flow channel switching piston 23. Specifically, wall portion 24 forms a double structure together with flow channel switching piston 23. Wall portion 24 may be formed of a thermoplastic resin.

Partitioning member 25 is connected to wall portion 24. A first chamber 2a and a second chamber 2b are provided between casing 21 and partitioning member 25. A pressure difference between first chamber 2a and second chamber 2b causes partitioning member 25 to slide. As partitioning member 25 slides, wall portion 24 and flow channel switching piston 23 slide.

Pilot valve 26 includes a first conduit 26a, a second conduit 26b, a third conduit 26c, and a fourth conduit 26d. Pilot valve 26 is configured to switch connection of first conduit 26a, second conduit 26b, third conduit 26c, and fourth conduit 26d by a spring and an electromagnet that are built in pilot valve 26.

First conduit 26a is connected to first connection port 22a. Second conduit 26b is connected to second connection port 22b. Third conduit 26c is connected to fifth connection port 22e. Third conduit 26c is connected to first chamber 2 of casing 21 through fifth connection port 22e. Fourth conduit 26d is connected to sixth connection port 22f. Fourth conduit 26d is connected to second chamber 2b of casing 21 through sixth connection port 22f.

First outdoor heat exchanger 3 serves to exchange heat between the refrigerant flowing in first outdoor heat exchanger 3 and the outdoor air. First outdoor heat exchanger 3 is connected to four-way valve 2 and first expansion valve 4. First outdoor heat exchanger 3 functions as a condenser that condenses the refrigerant during cooling operation and as an evaporator that evaporates the refrigerant during heating operation. First outdoor heat exchanger 3 is a heat exchanger of plate fin tube type which includes a plurality of fins and a tube passing through the plurality of fins.

First expansion valve 4 is configured to expand the refrigerant condensed by the condenser to decompress the refrigerant. First expansion valve 4 is connected to first outdoor heat exchanger 3 and indoor heat exchanger 5. First expansion valve 4 serves as a throttle device that decompresses the refrigerant condensed by first outdoor heat exchanger 3 during cooling operation and serves as a throttle device that decompresses the refrigerant condensed by indoor heat exchanger 5 during heating operation. First expansion valve 4 is, for example, a solenoid valve.

Indoor heat exchanger 5 serves to exchange heat between the refrigerant flowing in indoor heat exchanger 5 and the indoor air. Indoor heat exchanger 5 is connected to four-way valve 2 and first expansion valve 4. Indoor heat exchanger 5 serves as an evaporator that evaporates the refrigerant during cooling operation and serves as a condenser that condenses the refrigerant during heating operation. Indoor heat exchanger 5 is a heat exchanger of plate fin tube type which includes a plurality of fins and a tube passing through the plurality of fins.

Figure 2:
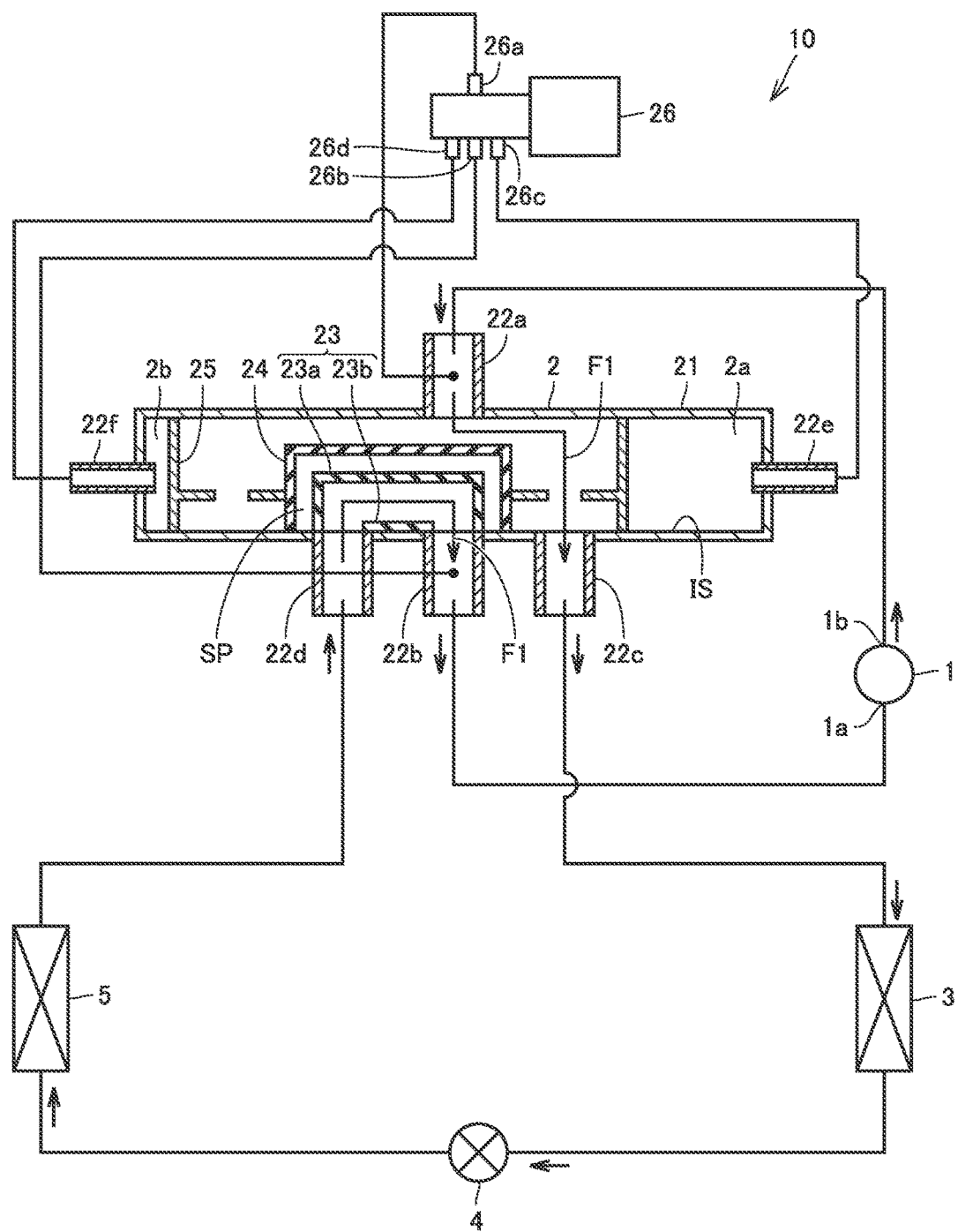
FIG. 2 is a refrigerant circuit diagram of the refrigeration cycle apparatus according to Embodiment 1 during cooling operation.
Figure 3:
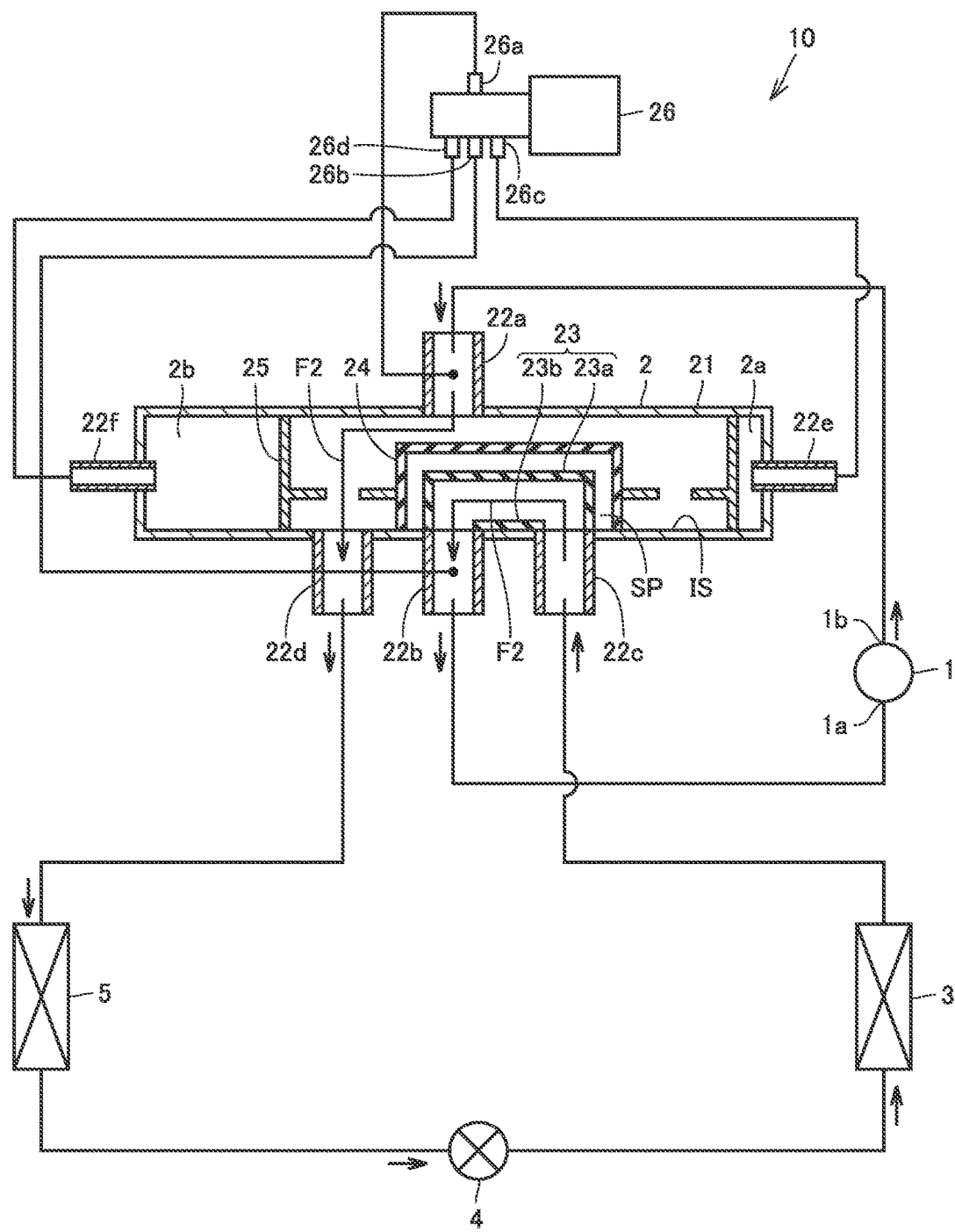
FIG. 3 is a refrigerant circuit diagram of the refrigeration cycle apparatus according to Embodiment 1 during heating operation.

Next, an operation of refrigeration cycle apparatus 10 according to Embodiment 1 will be described with reference to FIGS. 2 and 3.

First, the cooling operation of refrigeration cycle apparatus 10 according to Embodiment 1 will be described with reference to FIG. 2. FIG. 2 is a refrigerant circuit diagram of the refrigeration cycle apparatus according to Embodiment 1 during cooling operation. During cooling operation, the refrigerant circulates through the refrigerant circuit in order of compressor 1, four-way valve 2, first outdoor heat exchanger 3, first expansion valve 4, indoor heat exchanger 5, and four-way valve 2.

High-temperature, high-pressure gas refrigerant compressed by compressor 1 is discharged from compressor 1, flows through four-way valve 2, and radiates heat to the outdoor air to be condensed in first outdoor heat exchanger 3, turning into high-pressure liquid refrigerant. This high-pressure liquid refrigerant flows into first expansion valve 4 and expands to be decompressed in first expansion valve 4, turning into low-temperature, low-pressure gas-liquid-two-phase refrigerant.

This low-temperature, low-pressure gas-liquid-two-phase refrigerant flows into indoor heat exchanger 5, absorbs heat from the indoor air to evaporate in indoor heat exchanger 5, turning into low-pressure gas refrigerant. This low-pressure gas refrigerant returns to compressor 1 through four-way valve 2, and is then compressed by compressor 1. In this manner, the refrigerant circulates through the refrigerant circuit during cooling operation.

An operation of four-way valve 2 during cooling operation will now be described. During cooling operation, pilot valve 26 causes first chamber 2a of casing 21 to have a high pressure and second chamber 2b of casing 21 to have a low pressure. This causes flow channel switching piston 23 to slide together with partitioning member 25, thus bringing first connection port 22a and third connection port 22c into communication with each other and also bringing second connection port 22b and fourth connection port 22d into communication with each other. This causes the refrigerant to flow from first connection port 22a to third connection port 22c and also flow from fourth connection port 22d to second connection port 22b. In this manner, the refrigerant flows through first flow channel F1 of four-way valve 2.

Next, the heating operation of refrigeration cycle apparatus 10 according to Embodiment 1 will be described with reference to FIG. 3. FIG. 3 is a refrigerant circuit diagram of the refrigeration cycle apparatus according to Embodiment 1 during cooling operation. During heating operation, the refrigerant circulates through the refrigerant circuit in order of compressor 1, four-way valve 2, indoor heat exchanger 5, first expansion valve 4, first outdoor heat exchanger 3, and four-way valve 2.

The high-temperature, high-pressure gas refrigerant compressed by compressor 1 is discharged from compressor 1, flows through four-way valve 2, and radiates heat to the indoor air to be condensed in indoor heat exchanger 5, turning into high-pressure liquid refrigerant. This high-pressure liquid refrigerant flows into first expansion valve 4, expands to be decompressed in first expansion valve 4, turning into low-temperature, low-pressure gas-liquid-two-phase refrigerant.

This low-temperature, low-pressure gas-liquid-two-phase refrigerant flows into first outdoor heat exchanger 3, and absorbs heat from the outdoor air to evaporate in first outdoor heat exchanger 3, turning into low-pressure gas refrigerant. This low-pressure gas refrigerant returns to compressor 1 through four-way valve 2, and is compressed by compressor 1. In this manner, the refrigerant circulates through the refrigerant circuit during heating operation.

An operation of four-way valve 2 during heating operation will now be described. During heating operation, pilot valve 26 causes first chamber 2a of casing 21 to have a low pressure and second chamber 2b of casing 21 to have a high pressure. This causes partitioning member 25 and flow channel switching piston 23 to slide, thus bringing first connection port 22 and fourth connection port 22d into communication with each other and bringing second connection port 22b and third connection port 22c into communication with each other. This causes the refrigerant to flow from first connection port 22a to fourth connection port 22d and also flow from third connection port 22c to second connection port 22b. In this manner, the refrigerant flows through second flow channel F2 of four-way valve 2.

Next, the functions and effects of refrigeration cycle apparatus 10 according to Embodiment 1 will be described while comparing with those of a comparative example. For convenience of description, four-way valve 2 during cooling operation will be described by way of example.

Figure 4:
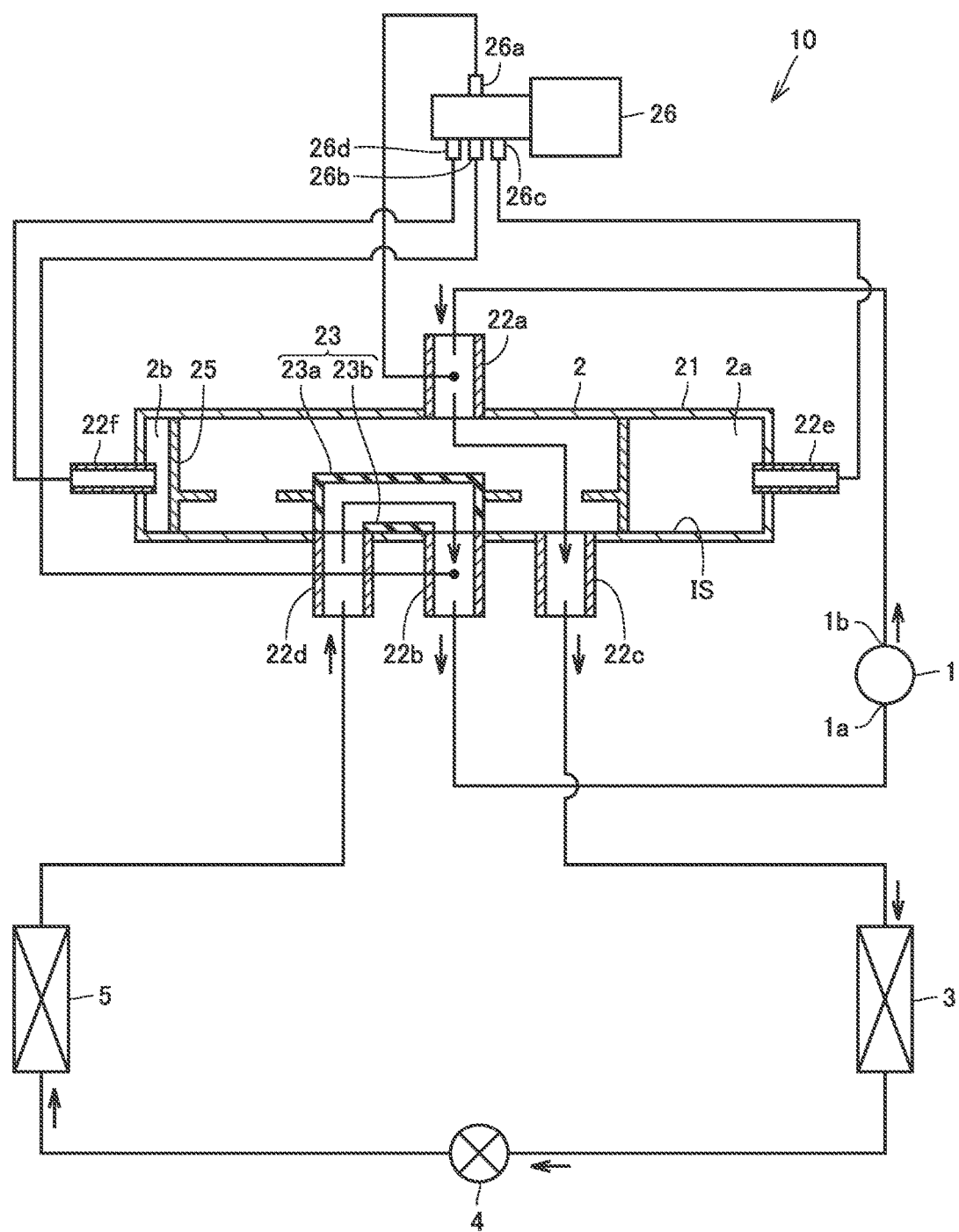
FIG. 4 is a refrigerant circuit diagram of a refrigeration cycle apparatus according to a comparative example.

A configuration of refrigeration cycle apparatus 10 according to the comparative example will be described with reference to FIG. 4. FIG. 4 is a refrigerant circuit diagram of refrigeration cycle apparatus 10 according to the comparative example. Refrigeration cycle apparatus 10 according to the comparative example has the same configuration and operation as those of refrigeration cycle apparatus 10 according to Embodiment 1 unless otherwise noted. Refrigeration cycle apparatus 10 according to the comparative example is different from refrigeration cycle apparatus 10 according to Embodiment 1 mainly in that it includes no wall portion of refrigeration cycle apparatus 10 according to Embodiment 1.

Figure 5:
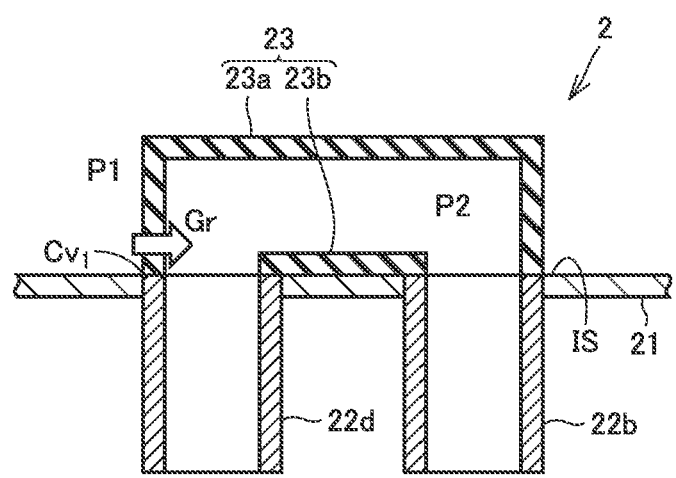
FIG. 5 is a sectional view showing a configuration of a flow channel switching piston and its surroundings of the refrigeration cycle apparatus according to the comparative example.

Referring to FIG. 5, description will be given of a leakage flow rate of the refrigerant that leaks from the high-pressure side to the low-pressure side in four-way valve 2 of refrigeration cycle apparatus 10 according to the comparative example. As indicated by the open arrow in FIG. 5, the refrigerant leaks from the high-pressure side to the low-pressure side through the gap between flow channel switching piston 23 and inner surface IS.

Generally, the relation among a flow rate coefficient Cv, a leakage flow rate Gr, and a pressure difference ΔP is represented by Expression (1) below.

[Math 1]

$$Gr \propto Cv \times \sqrt{\Delta P} \quad (1)$$

Expression (1) above is represented by Expression (2) with the use of a constant of proportion K, a high-pressure-side pressure P1, a low-pressure-side pressure P2, and a flow rate coefficient $Cv_1$ at a leakage spot in the sliding portion of flow channel switching piston 23. High-pressure-side pressure P1 is a pressure outside of flow channel switching piston 23. Low-pressure-side pressure P2 is a pressure inside of flow channel switching piston 23.

[Math 2]

$$Gr = K \times Cv_1 \times \sqrt{P1 - P2} \quad (2)$$

Figure 6:
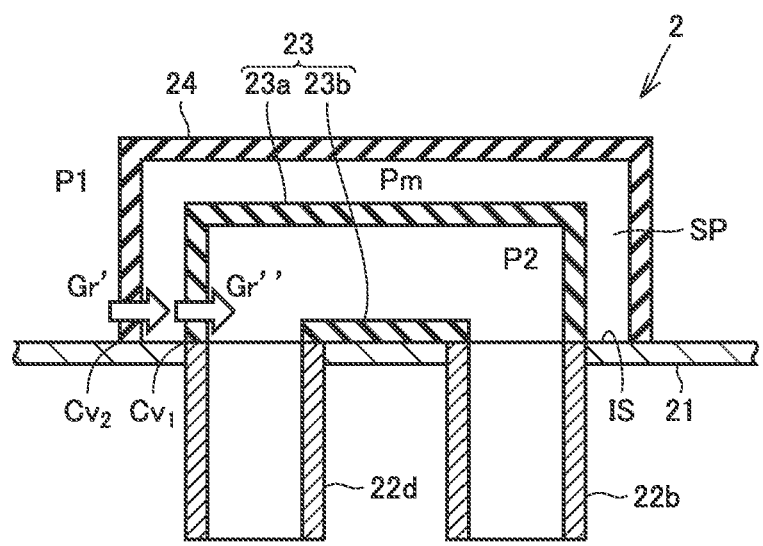
FIG. 6 is a sectional view showing a configuration of a flow channel switching piston and its surroundings of the refrigeration cycle apparatus according to Embodiment 1.

Referring to FIG. 6, description will be given of a leakage flow rate of the refrigerant that leaks from the high-pressure side to the low-pressure side in four-way valve 2 of refrigeration cycle apparatus 10 according to Embodiment 1. As indicated by the open arrows in FIG. 6, the refrigerant leaks from the high-pressure side to the low-pressure side through the gap between wall portion 24 and inner surface IS and through the gap between flow channel switching piston 23 and inner surface IS. The pressure outside of wall portion 24 is a high pressure, and the pressure inside of flow channel switching piston 23 is a low pressure. The pressure in space SP between wall portion 24 and flow channel switching piston 23 is an intermediate pressure.

Constant of proportion K, high-pressure-side pressure P1, a pressure Pm in space SP between wall portion 24 and flow channel switching piston 23, a flow rate coefficient $Cv_2$ at a leakage spot in the sliding portion along which inner surface IS slides, and a leakage flow rate Gr' at that spot is represented by Expression (3) below. High-pressure-side pressure P1 is a pressure outside of wall portion 24.

[Math 3]

$$Gr' = K \times Cv_2 \times \sqrt{P1 - Pm} \quad (3)$$

Constant of proportion K, low-pressure-side pressure P2, pressure Pm in space SP between wall portion 24 and flow channel switching piston 23, flow rate coefficient $Cv_1$ at a leakage spot in the sliding portion of flow channel switching piston 23 on which inner surface IS slides, and a leakage flow rate Gr'' at that spot is represented by Expression (4) below. Low-pressure-side pressure P2 is a pressure inside of flow channel switching piston 23.

[Math 4]

$$Gr'' = K \times Cv_1 \times \sqrt{Pm - P2} \quad (4)$$

Since leakage flow rate Gr' and leakage flow rate Gr'' are equal to each other (Gr'=Gr'') once the state of the refrigerant is stabilized, Expression (5) below is obtained by rearranging Expressions (3) and (4) above.

[Math 5]

$$Gr' = Gr'' = K \times \frac{1}{\sqrt{\frac{1}{Cv_1^2} + \frac{1}{Cv_2^2}}} \times \sqrt{P1 - P2} \quad (5)$$

In Expression (5), the value of the term including the flow rate coefficient is smaller than that of flow rate coefficient $Cv_1$ as represented by Expressions (6) and (7) below. Thus, the leakage flow rate of the refrigerant decreases as wall portion 24 is provided.

When flow rate coefficient $Cv_1$ is not greater than flow rate coefficient $Cv_2$ ($Cv_1 \leq Cv_2$), the flow rate coefficient is represented by Expression (6) below.

[Math 6]

$$\frac{1}{\sqrt{\frac{1}{Cv_1^2} + \frac{1}{Cv_2^2}}} \leq \frac{1}{\sqrt{\frac{1}{Cv_1^2} + \frac{1}{Cv_1^2}}} = \frac{\sqrt{2}}{2} Cv_1 < Cv_1 \quad (6)$$

When flow rate coefficient $Cv_2$ is not greater than flow rate coefficient $Cv_1$ ($Cv_2 \leq Cv_1$), the flow rate coefficient is represented by Expression (7) below.

[Math 7]

$$\frac{1}{\sqrt{\frac{1}{Cv_1^2} + \frac{1}{Cv_2^2}}} \leq \frac{1}{\sqrt{\frac{1}{Cv_2^2} + \frac{1}{Cv_2^2}}} = \frac{\sqrt{2}}{2} Cv_2 < Cv_1 \quad (7)$$

As described above, according refrigeration cycle apparatus 10 of Embodiment 1, in our-way valve 2, wall portion 24 is configured to slide along the inner surface together with flow channel switching piston 23 and is disposed with space SP between flow channel switching piston 23 and wall portion 24 to cover flow channel switching piston 23. The pressure of the refrigerant in space SP between wall portion 24 and flow channel switching piston 23 can thus be an intermediate pressure between the high-pressure side and the low-pressure side. This can reduce an amount of the refrigerant that leaks from the high-pressure side to the low-pressure side in four-way valve 2. The amount of the refrigerant flowing into indoor heat exchanger 5 can thus be increased. As a result, heat exchange performance can be improved.

According to refrigeration cycle apparatus 10 of Embodiment 1, first flow channel F1 is configured to pass the refrigerant from first connection port 22a to third connection port 22c and pass the refrigerant from fourth connection port 22d to second connection port 22b. Second flow channel F2 is configured to pass the refrigerant from first connection port 22a to fourth connection port 22d and pass the refrigerant from third connection port 22c to second connection port 22b. This allows flow channel switching piston 23 to switch between passing the refrigerant from first connection port 22a to third connection port 22c and also from fourth connection port 22d to second connection port 22b, and passing the refrigerant from first connection port 22a to fourth connection port 22d and also from third connection port 22c to second connection port 22b.

In refrigeration cycle apparatus 10 according to Embodiment 1, wall portion 24 and flow channel switching piston 23 are each formed of a thermoplastic resin. The thermoplastic resin has a thermal conductivity of 0.2 to 0.5 (W/mK). On the other hand, a HFC refrigerant, such as R32, has a thermal conductivity of 0.02 (W/mK) in the gas phase. Thus, the HFC refrigerant in the gas phase has a higher heat insulation capacity than the thermoplastic resin. Thus, as the refrigerant fills a gap between wall portion 24 and flow channel 23, refrigeration cycle apparatus 10 according to Embodiment 1 has more improved heat insulation performance than in the case where wall portion 24 and the flow channel switching piston are each formed of only the thermoplastic resin. This can reduce a heat loss in four-way valve 2.

Embodiment 2

Embodiment 2 has the same configuration and operation as well as functions and effects as those of Embodiment 1 unless otherwise noted. Thus, the same components of Embodiment 2 as those of Embodiment 1 are denoted by the same reference numerals, and redundant description will not be repeated. Embodiment 2 is different from Embodiment 1 mainly in that it includes a first intermediate pressure channel.

Figure 7:
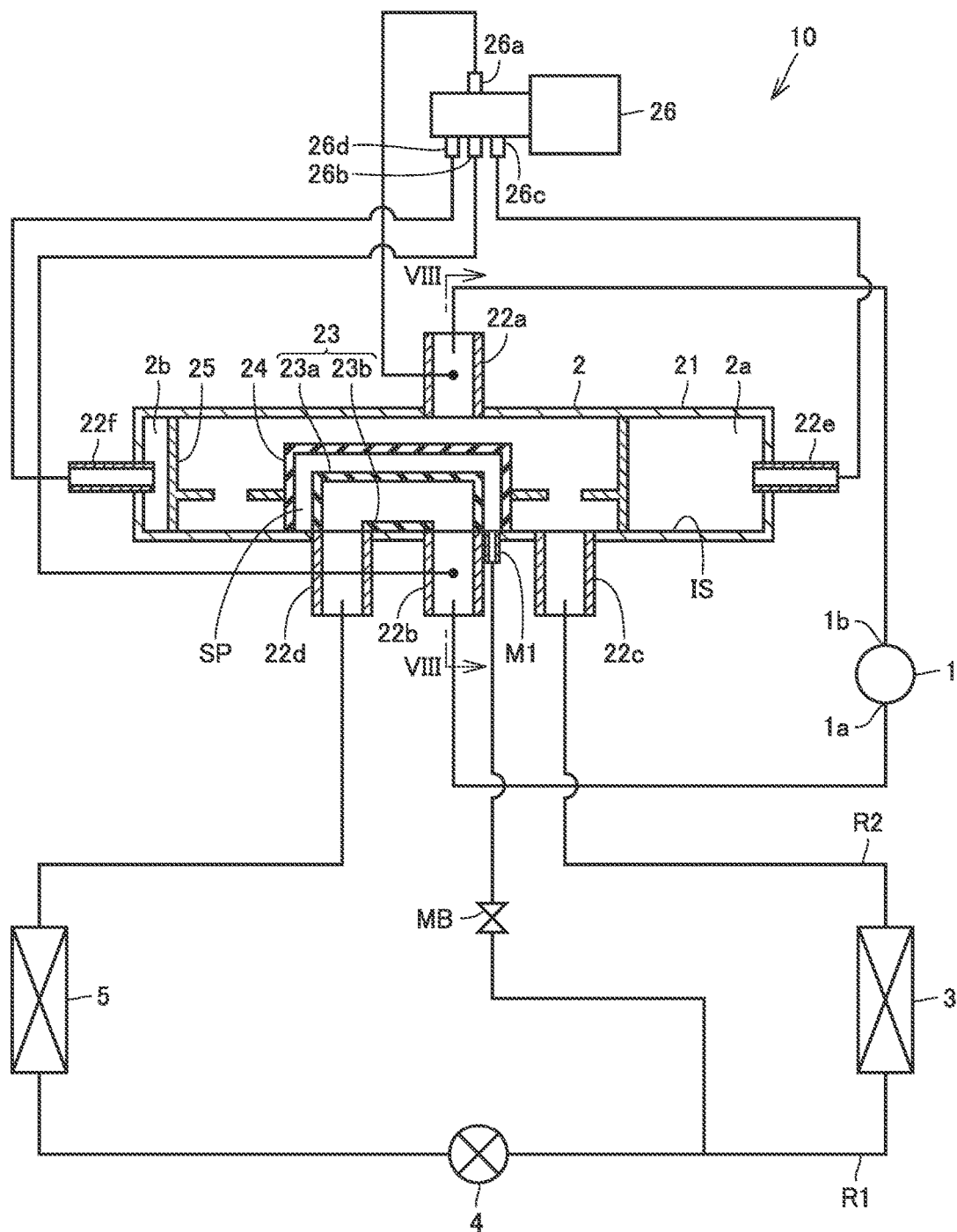
FIG. 7 is a refrigerant circuit diagram of a refrigeration cycle apparatus according to Embodiment 2.
Figure 8:
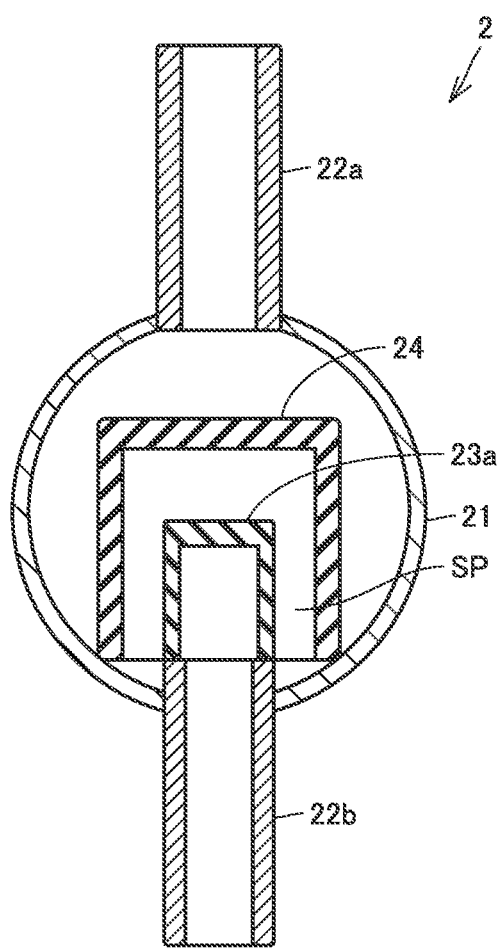
FIG. 8 is an enlarged sectional view taken along the line VIII-VIII of FIG. 7.

The configuration of refrigeration cycle apparatus 10 according to Embodiment 1 will be described with reference to FIGS. 7 and 8. FIG. 7 is a refrigerant circuit diagram of refrigeration cycle apparatus 10 according to Embodiment 2. FIG. 8 is an enlarged sectional view taken along the line VIII-VIII of FIG. 7.

Refrigeration cycle apparatus 10 according to Embodiment 2 further includes a first channel R1, a second channel R2, and a first intermediate pressure channel M1. First channel R1 connects first outdoor heat exchanger 3 to first expansion valve 4. First channel R1 is configured by connecting first outdoor heat exchanger 3 to first expansion valve 4 by a pipe. Second channel R2 connects compressor 1 to first outdoor heat exchanger 3. Second channel R2 is configured by connecting compressor 1 to first outdoor heat exchanger 3 by a pipe. Specifically, second channel R2 is configured by connecting compressor 1 to first outdoor heat exchanger 3 by a pipe through four-way valve 2. First channel R1 and second channel R2 are disposed on the high-pressure side of the refrigerant circuit.

First intermediate pressure channel M1 connects first channel R1 or second channel R2 to space SP of four-way valve 2. First intermediate pressure channel M1 is configured by connecting first channel R1 or second channel R2 to space SP of four-way valve 2 by a pipe. First intermediate pressure channel M1 includes an on-off valve MB. On-off valve MB is configured to open and close the first intermediate pressure channel. On-off valve MB is, for example, a solenoid valve. In Embodiment 2, first intermediate pressure channel M1 connects first channel R1 to space SP of four-way valve 2.

Figure 9:
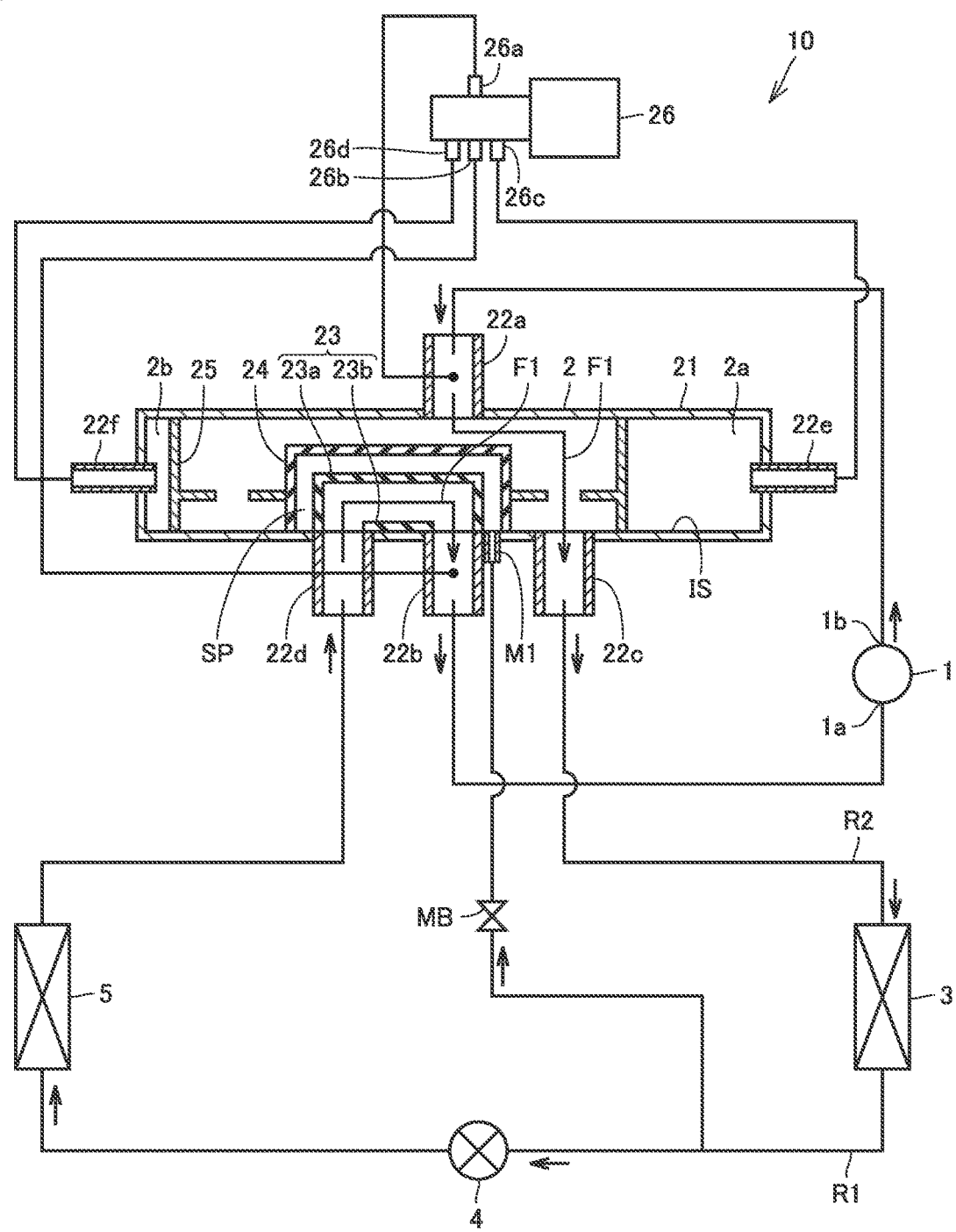
FIG. 9 is a refrigerant circuit diagram of the refrigeration cycle apparatus according to Embodiment 2 during cooling operation.

Next, an operation of refrigeration cycle apparatus 10 according to Embodiment 2 will be described with reference to FIG. 9. For convenience of description, refrigeration cycle apparatus 10 during cooling operation will be described by way of example.

At the start of operation (at the activation of a compressor), on-off valve MB of first intermediate pressure channel M1 is opened. On-off valve MB is opened for a certain period of time for generating an intermediate pressure and is closed after a lapse of the certain period of time. As a result, an intermediate pressure is generated immediately at the start of operation in space SP of four-way valve 2.

Next, the functions and effects of refrigeration cycle apparatus 10 according to Embodiment 2 will be described while comparing with those of refrigeration cycle apparatus 10 according to Embodiment 1.

Figure 10:
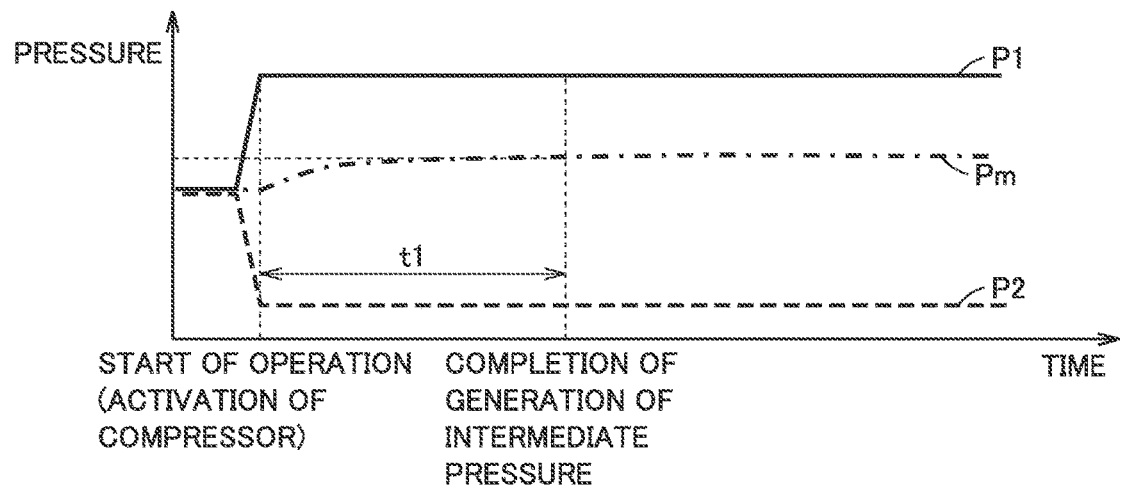
FIG. 10 is a graph showing a time that elapses before the completion of generation of an intermediate pressure in the refrigeration cycle apparatus according to Embodiment 1 for comparison with the refrigeration cycle apparatus according to Embodiment 2.
Figure 11:
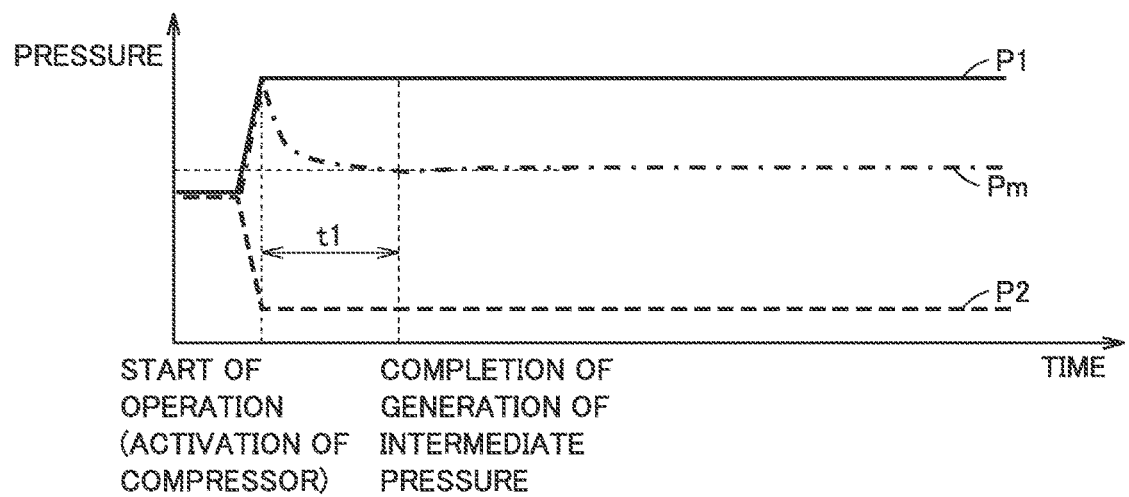
FIG. 11 is a graph showing a time that elapses before the completion of generation of an intermediate pressure in the refrigeration cycle apparatus according to Embodiment 2.

Referring to FIGS. 10 and 11, description will be given of the state before the completion of generation of an intermediate pressure at four-way valve 2 in refrigeration cycle apparatus 10 according to Embodiment 2. FIG. 10 is a graph showing a time that elapses before the completion of generation of an intermediate pressure in the refrigeration cycle apparatus according to Embodiment 1 for comparison with refrigeration cycle apparatus 10 according to Embodiment 2. FIG. 11 is a graph showing a time that elapses before the completion of generation of an intermediate pressure in refrigeration cycle apparatus 10 according to Embodiment 2.

Referring to FIG. 10, refrigeration cycle apparatus 10 according to Embodiment 1 includes no first intermediate pressure channel M1, and accordingly, an intermediate pressure is generated gradually from the pressure at the time of stop of operation in four-way valve 2. This results in a longer time (t1) that elapses before the completion of generation of an intermediate pressure than in Embodiment 2.

Referring to FIG. 11, in refrigeration cycle apparatus 10 according to Embodiment 2, as on-off valve MB of first intermediate pressure channel M1 is opened at the start of operation, the pressure in space SP is equal to a high pressure in four-way valve 2. As on-off valve MB is closed, the pressure in space SP in four-way valve 2 decreases from the high pressure to the intermediate pressure. This can reduce the time (t1) that elapses before the completion of generation of the intermediate pressure more than in Embodiment 1.

As described above, according to refrigeration cycle apparatus 10 of Embodiment 2, first intermediate pressure channel M1 connects first channel R1 or second channel R2 to space SP of four-way valve 2, and on-off valve MB is configured to open and close first intermediate pressure channel M1. Thus, as the high-pressure refrigerant is passed from first channel R1 or second channel R2 to space SP of four-way valve 2, an intermediate pressure can be generated immediately in space SP.

According to refrigeration cycle apparatus 10 of Embodiment 2, first intermediate pressure channel M1 connects first channel R1 to the space. The refrigerant, the temperature of which has decreased due to heat radiation to the outdoor air in first outdoor heat exchanger 3, can thus be passed to space SP of four-way valve 2. This can restrain heat transfer from the refrigerant flowing through space SP of four-way valve 2 to the refrigerant flowing in flow channel switching piston 23.

Embodiment 3

Embodiment 3 has the same configuration and operation as well as functions and effects as those of Embodiment 1 unless otherwise noted. Thus, the same components of Embodiment 3 as those of Embodiment 1 are denoted by the same reference numerals, and redundant description will not be repeated. Embodiment 3 is different from Embodiment 1 mainly in that it includes a second intermediate pressure channel, a second expansion valve, and a second outdoor heat exchanger.

Figure 12:
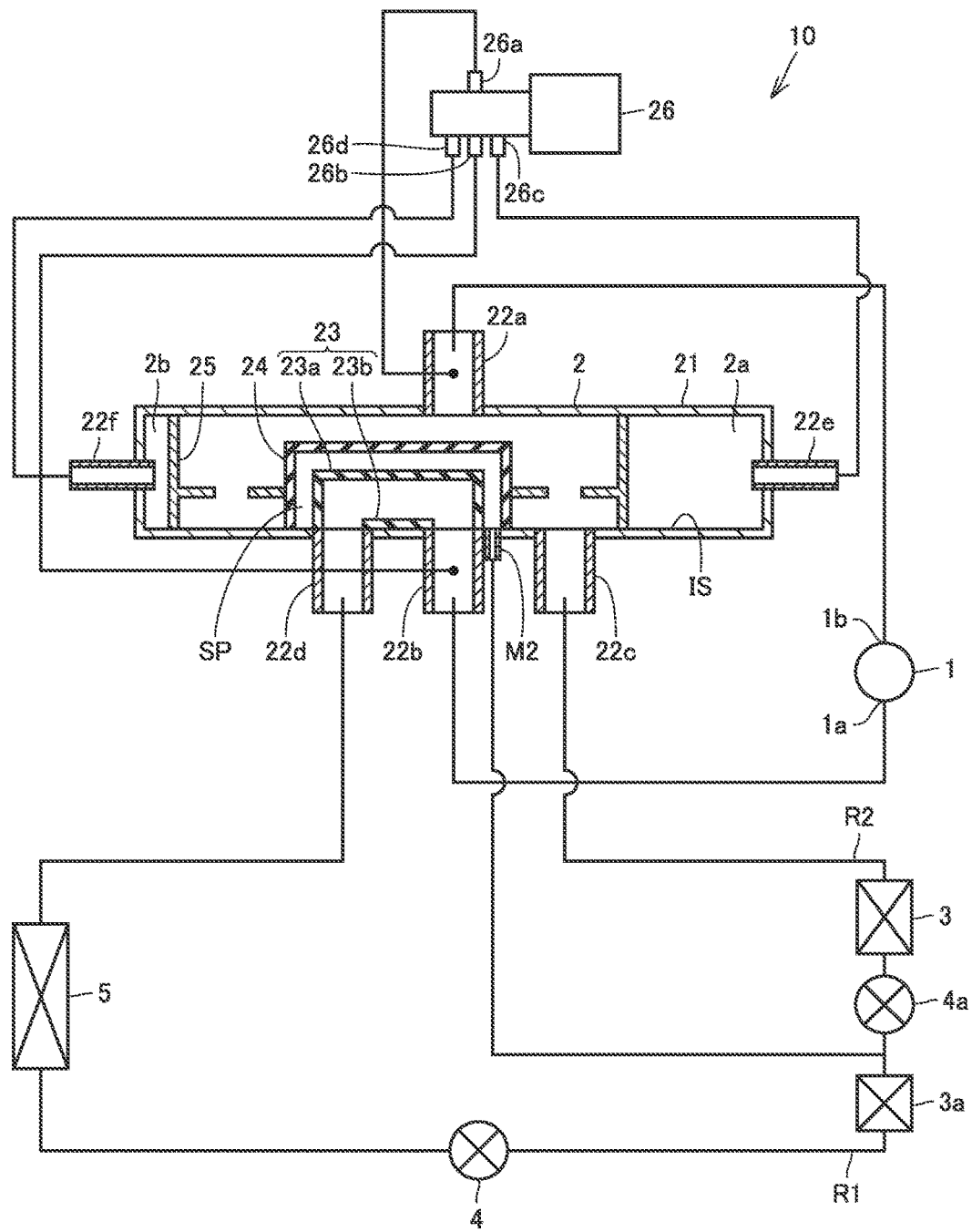
FIG. 12 is a refrigerant circuit diagram of a refrigeration cycle apparatus according to Embodiment 3.

The configuration of refrigeration cycle apparatus 10 according to Embodiment 3 will be described with reference to FIG. 12. FIG. 12 is a refrigerant circuit diagram of refrigeration cycle apparatus 10 according to Embodiment 3.

Refrigeration cycle apparatus 10 according to Embodiment 3 further includes a first channel R1 and a second intermediate pressure channel M2. First channel R1 connects first outdoor heat exchanger 3 to first expansion valve 4. First channel R1 is configured by connecting first outdoor heat exchanger 3 to first expansion valve 4 by a pipe. First channel R1 includes a second expansion valve 4a. Second expansion valve 4a is configured to expand the refrigerant condensed in the condenser to decompress the refrigerant. Second expansion valve 4a is connected to first outdoor heat exchanger 3. Second expansion valve 4a is, for example, a solenoid valve.

Second intermediate pressure channel M2 connects first channel R1 to space SP of four-way valve 2. Second intermediate pressure channel M2 is configured by connecting first channel R1 to space SP of four-way valve 2 by a pipe. Second intermediate pressure channel M2 is always opened. Second intermediate pressure channel M can thus include no on-off valve. Second intermediate pressure channel M2 is connected to between first expansion valve 4 and second expansion valve 4a in first channel R1.

First channel R1 includes a second outdoor heat exchanger 3a. Second outdoor heat exchanger 3a serves to exchange heat between the refrigerant flowing in second outdoor heat exchanger 3a and the outside air. Second outdoor heat exchanger 3a is disposed between first expansion valve 4 and second expansion valve 4a in first channel R1. Second intermediate pressure channel M2 is connected to between second expansion valve 4a and second outdoor heat exchanger 3a in first channel R1.

Figure 13:
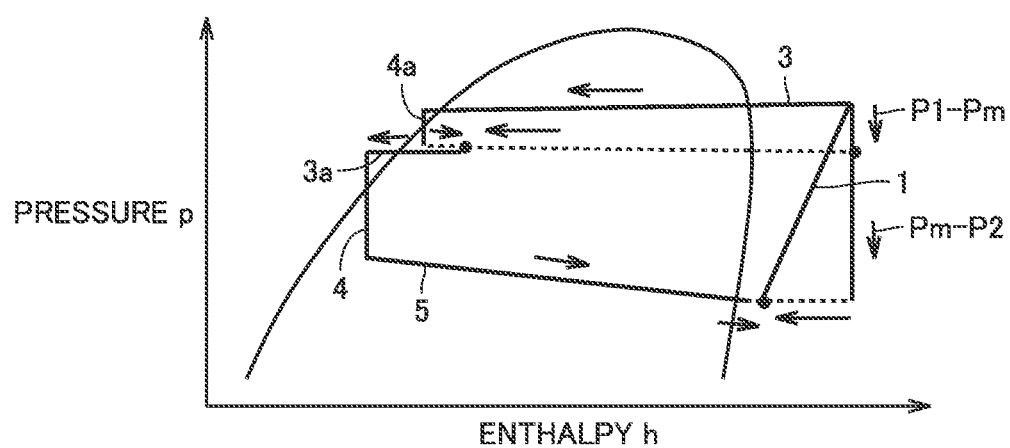
FIG. 13 is a p-h diagram of the refrigeration cycle apparatus according to Embodiment 3.

Next, an operation of refrigeration cycle apparatus 10 according to Embodiment 3 will be described with reference to FIGS. 12 and 13. For convenience of description, refrigeration cycle apparatus 10 during cooling operation will be described by way of example.

The high-temperature, high-pressure gas refrigerant compressed by compressor 1 flows through four-way valve 2 and is condensed in first outdoor heat exchanger 3, turning into high-temperature liquid refrigerant. This high-temperature liquid refrigerant flows into second expansion valve 4a and expands to be decompressed in expansion valve 4a, turning into gas-liquid-two-phase refrigerant.

This gas-liquid-two-phase refrigerant flows into second outdoor heat exchanger 3a and is condensed in second outdoor heat exchanger 3a, turning into high-temperature liquid refrigerant. This high-temperature liquid refrigerant flows into first expansion valve 4 and expands to be decompressed in first expansion valve 4, turning into low-temperature, low-pressure gas-liquid-two-phase refrigerant.

This low-temperature, low-pressure gas-liquid-two-phase refrigerant flows into indoor heat exchanger 5 and absorbs heat from the indoor air to evaporate in indoor heat exchanger 5, turning into low-pressure gas refrigerant. This low-pressure gas refrigerant returns to compressor 1 through four-way valve 2 and is compressed by compressor 1. In this manner, the refrigerant circulates through the refrigerant circuit during cooling operation.

Next, the functions and effects of refrigeration cycle apparatus 10 according to Embodiment 3 will be described.

According to refrigeration cycle apparatus 10 of Embodiment 3, second intermediate pressure channel M2 is connected to between first expansion valve 4 and second expansion valve 4a in first channel R1. Thus, the pressure between first expansion valve 4 and second expansion valve 4a can generate an intermediate pressure in space SP of four-way valve 2.

According to refrigeration cycle apparatus 10 of Embodiment 3, second intermediate pressure channel M2 is connected to between second expansion valve 4a and second outdoor heat exchanger 3a in first channel R1. Thus, a part of the leakage flow rate of the refrigerant in four-way valve 2 is collected by first channel R1 and condensed in second outdoor heat exchanger 3a. The collected refrigerant flows into indoor heat exchanger 5, and accordingly, the amount of the refrigerant flowing through indoor heat exchanger 5 can be increased.

It should be construed that the embodiments disclosed herein are given by way of illustration in all respects, not by way of limitation. It is therefore intended that the scope of the present invention is defined by claims, not only by the embodiments described above, and encompasses all modifications and variations equivalent in meaning and scope to the claims.

REFERENCE SIGNS LIST 1 compressor; 1a inlet; 1b outlet; 2 four-way valve; 3 first outdoor heat exchanger; 3a second outdoor heat exchanger; 4 first expansion valve; 4a second expansion valve; 5 indoor heat exchanger; 10 refrigeration cycle apparatus; 21 casing; 22a first connection port; 22b second connection port; 22c third connection port; 22d fourth connection port; 22e fifth connection port; 22f sixth connection port; 23 switching piston; 24 wall portion; 25 partitioning member; 26 pilot valve; F1 first flow channel; F2 second flow channel; IS inner surface; M1 first intermediate pressure channel; M2 second intermediate pressure channel; R1 first channel; R2 second channel; SP space.

The invention claimed is:

1. A refrigeration cycle apparatus comprising:
   a compressor configured to compress refrigerant;
   a four-way valve connected to the compressor;
   a first outdoor heat exchanger connected to the four-way valve;
   a first expansion valve connected to the first outdoor heat exchanger; and
   an indoor heat exchanger connected to the first expansion valve and the four-way valve,
   the four-way valve being configured to switch between passing the refrigerant compressed by the compressor to the first outdoor heat exchanger and passing the refrigerant compressed by the compressor to the indoor heat exchanger,
   the four-way valve comprising
   a casing having an inner surface,
   a first flow channel and a second flow channel disposed in the casing, and
   a flow channel switching piston and a wall portion disposed in the casing,
   the flow channel switching piston being configured to slide along the inner surface to switch between passing the refrigerant through the first flow channel and passing the refrigerant through the second flow channel,
   the wall portion being configured to slide along the inner surface together with the flow channel switching piston, the wall portion being disposed with a space between the flow channel switching piston and the wall portion to cover the flow channel switching piston.

2. The refrigeration cycle apparatus according to claim 1, wherein
   the compressor has an inlet and an outlet and is configured to compress the refrigerant sucked from the inlet and discharge the refrigerant from the outlet,
   the casing comprises
   a first connection port connected to the outlet of the compressor,
   a second connection port connected to the inlet of the compressor,
   a third connection port connected to the first outdoor heat exchanger, and a fourth connection port connected to the indoor heat exchanger, the first flow channel is configured to pass the refrigerant from the first connection port to the third connection port and pass the refrigerant from the fourth connection port to the second connection port, and the second flow channel is configured to pass the refrigerant from the first connection port to the fourth connection port and pass the refrigerant from the third connection port to the second connection port.

3. The refrigeration cycle apparatus according to claim 2, further comprising:

a first channel connecting the first outdoor heat exchanger to the first expansion valve;

a second channel connecting the compressor to the first outdoor heat exchanger; and a first intermediate pressure channel connecting the first channel or the second channel to the space, wherein the first intermediate pressure channel comprises an on-off valve, and the on-off valve is configured to open and close the first intermediate pressure channel.

4. The refrigeration cycle apparatus according to claim 3, wherein the first intermediate pressure channel connects the first channel to the space.

5. The refrigeration cycle apparatus according to claim 2, further comprising:

a first channel connecting the first outdoor heat exchanger to the first expansion valve; and a second intermediate pressure channel connecting the first channel to the space, wherein the first channel comprises a second expansion valve, and the second intermediate pressure channel is connected to between the first expansion valve and the second expansion valve in the first channel.

6. The refrigeration cycle apparatus according to claim 5, wherein the first channel comprises a second outdoor heat exchanger, the second outdoor heat exchanger is disposed between the first expansion valve and the second expansion valve in the first channel, and the second intermediate pressure channel is connected to between the second expansion valve and the second outdoor heat exchanger in the first channel.

7. The refrigeration cycle apparatus according to claim 1, further comprising:

a first channel connecting the first outdoor heat exchanger to the first expansion valve;

a second channel connecting the compressor to the first outdoor heat exchanger; and a first intermediate pressure channel connecting the first channel or the second channel to the space, wherein the first intermediate pressure channel comprises an on-off valve, and the on-off valve is configured to open and close the first intermediate pressure channel.

8. The refrigeration cycle apparatus according to claim 7, wherein the first intermediate pressure channel connects the first channel to the space.

9. The refrigeration cycle apparatus according to claim 1, further comprising:

a first channel connecting the first outdoor heat exchanger to the first expansion valve; and a second intermediate pressure channel connecting the first channel to the space, wherein the first channel comprises a second expansion valve, and the second intermediate pressure channel is connected to between the first expansion valve and the second expansion valve in the first channel.

10. The refrigeration cycle apparatus according to claim 9, wherein the first channel comprises a second outdoor heat exchanger, the second outdoor heat exchanger is disposed between the first expansion valve and the second expansion valve in the first channel, and the second intermediate pressure channel is connected to between the second expansion valve and the second outdoor heat exchanger in the first channel.

* * * * *